United States Patent [19]
Smith

[11] 3,813,104
[45] May 28, 1974

[54] SEALING RING
[75] Inventor: Dean G. Smith, Troy, Ohio
[73] Assignee: The B. F. Goodrich Company, New York, N.Y.
[22] Filed: July 18, 1972
[21] Appl. No.: 272,801

[52] U.S. Cl............... 277/94, 277/189, 308/187.2
[51] Int. Cl........................ B65d 53/00, F16c 33/78
[58] Field of Search.................... 277/94, 95, 189; 308/187.1, 187.2

[56]           References Cited
          UNITED STATES PATENTS
2,755,113   7/1956   Baumheckel ........................ 277/94
2,886,347   5/1959   Kupchick ........................ 277/94 X
3,114,559   12/1963  Miglietti et al. ..................... 277/94
3,114,560   12/1963  Dunn .................................. 277/94
3,368,853   2/1968   Van Wyk et al..................... 277/94

Primary Examiner—Samuel B. Rothberg
Attorney, Agent, or Firm—John D. Haney

[57]           ABSTRACT

A sealing ring having radially extending clips which may be deflected for insertion into a retaining slot in a surrounding supporting member. The clips resiliently urge the sealing ring into sealing contact with the surrounding member and resiliently hold the ring in a concentric position in the retaining slot.

6 Claims, 8 Drawing Figures

SEALING RING

BACKGROUND OF THE INVENTION

This invention relates to sealing rings and particularly to annular grease seals which are mounted on a wheel hub and seal the space between the hub and the nonrotating race of a roller bearing. The seals used heretofore have been two-piece assemblies in which the reinforced rubber sealing ring has been positioned against a shoulder of the wheel hub with the outer periphery held in place by a cylindrical flange. A separate retaining ring which snaps into a groove machined in the cylindrical flange has been used to hold the seal in place. It has been found that in applications where the diameter of the rings has been increased the retaining rings do not have an adequate radial load component to withstand the forces exerted by the sealing ring and the retaining rings have been dislodged from the grooves and the sealing rings became displaced. The seal assemblies used heretofore have also been costly because the groove for the retainer ring has required precision machining. Since the grease seal retains the lubricant in the roller bearing which is a critical part of a wheel and axle assembly especially for aircraft it is important that the seal assembly be dependable and stay in place under all operating conditions. A burned out wheel bearing which would probably result from the loss of the grease from the bearing could cause an accident which could be very serious in an aircraft installation.

SUMMARY OF THE INVENTION

According to this invention an annular seal is provided having clips for insertion into a retaining ring groove and the need for a separate retainer ring and precision machining of the groove is eliminated. The clips are resiliently supported by the sealing ring and hold the ring in concentric relationship as well as in sealing contact with the surface of the wheel hub. With this design the danger of a retainer ring being lost and permitting the sealing ring to drop off is eliminated. Also the tolerances for the groove can be reduced without sacrificing safety and dependability of the seal installation.

The accompanying drawings show a preferred form and modification made in accordance with and embodying this invention and which are representative of how this invention may be practiced.

DETAILED DESCRIPTION

Figure 1:
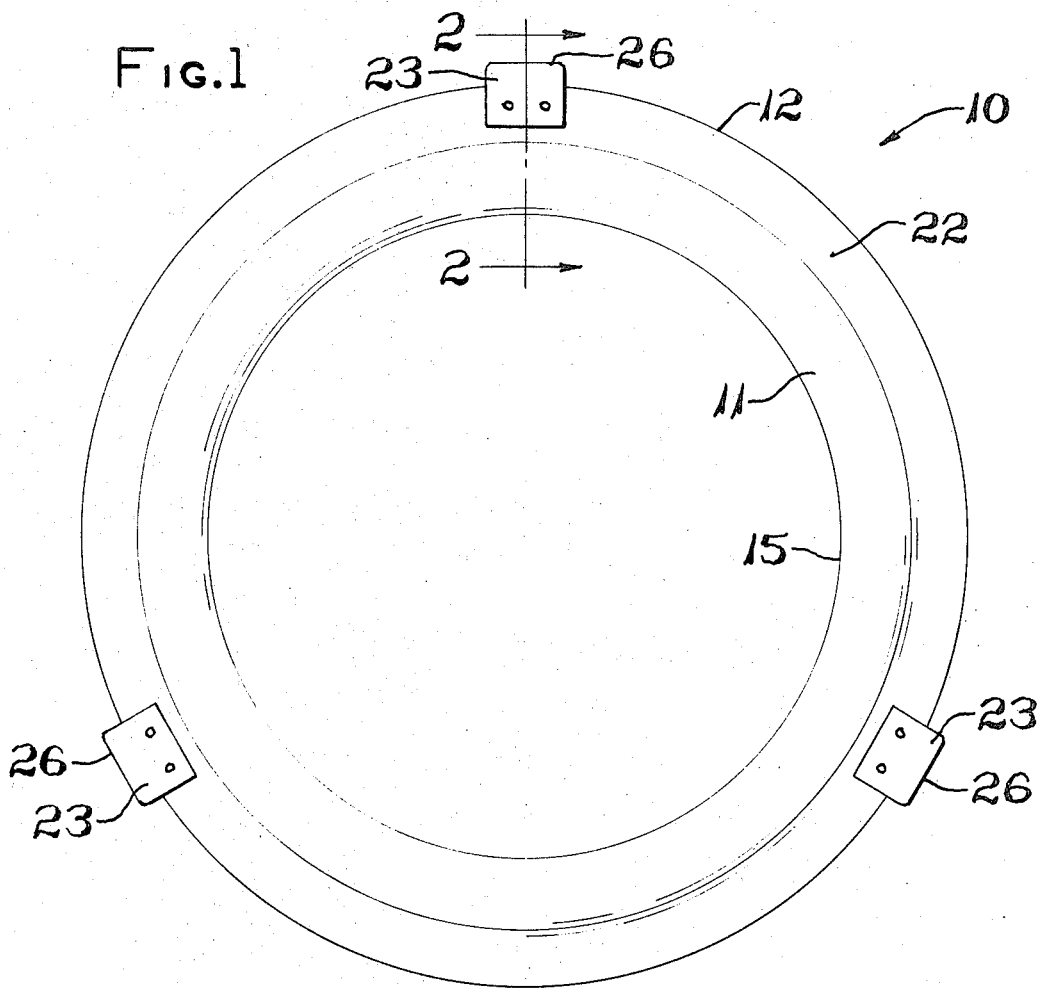
FIG. 1 is a plan view of an annular seal embodying the invention.
Figure 2:
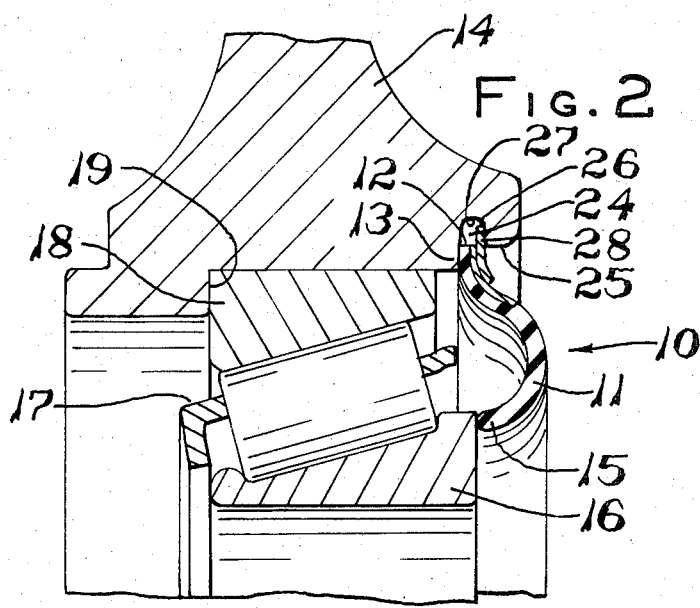
FIG. 2 is a sectional view taken along the plane of line 2—2 of FIG. 1 showing the seal mounted in sealing relationship with a wheel hub bearing assembly, parts being broken away.

Referring to FIGS. 1 and 2 an annular grease seal 10 is shown which has a ring 11 of resilient rubber or other rubberlike material with a radially outer edge 12 for sealing engagement with a surface of a shoulder 13 on a wheel hub 14. The ring 11 has a radially inner edge 15 for sealing engagement with a nonrotating race 16 of a roller bearing assembly 17. A rotating race 18 of the assembly 11 is seated in a recess 19 of the wheel hub 14.

A reinforcing member such as metal insert 22 of a relatively thin resilient metallic material such as steel is adhered to the outer edge 12 of the ring 11 at the surface which is out of engagement with the shoulder 13 of the wheel hub 14. The insert 22 extends circumferentially of the ring 11 and radially inward to provide a stiffening effect to the ring 11 and urge the inner edge 15 into sealing engagement with the nonrotating race 16 of the roller bearing assembly 17.

Clip members 23 are fastened to the metal insert 22 at the outer edge 12 of the ring 11 as by spot welding and are resiliently supported for deflection so that they may be inserted into a groove 24 in a cylindrical flange 25 of the wheel hub 14. As shown in FIG. 1, three clip members 23 are fastened to the insert 22 at spaced-apart positions around the seal 10. However it is understood that more clip members may be used if desirable and necessary to provide the support needed for the seal. Each of the clip members 23 extends radially outward providing a peripheral edge 26 spaced from the outer edge 12 of the ring 11. The peripheral edge 26 of the clip members 23 engages a bottom wall 27 of the groove 24 and this serves to hold the seal 10 in a concentric position relative to the bearing assembly 17. The clip members 23 also resiliently bear against an outer side wall 28 of the groove 24 urging the outer edge 12 of the ring 11 in sealing engagement with the surface of the shoulder 13 of the wheel hub 14.

Figure 4:
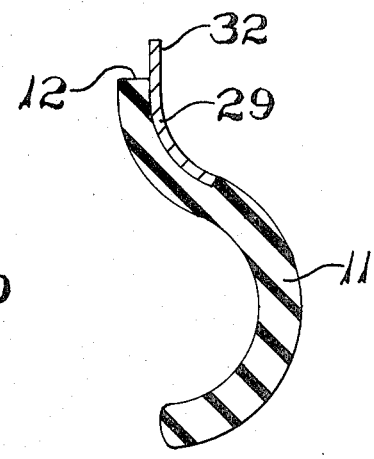
FIG. 4 is a sectional view taken along the plane of line 4—4 of FIG. 3.
Figure 3:
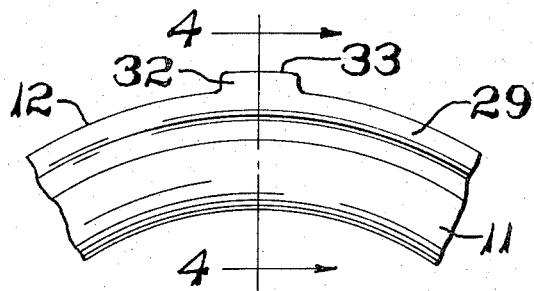
FIG. 3 is a fragmentary plan view of a modified annular seal embodying the invention.

A modification of the seal 10 is shown in FIGS. 3 and 4 wherein the ring 11 of rubber or other resilient rubber-like material has a metal insert 29 adhered to the outer edge 12. Clip members such as extensions 32 of the metal insert 29 extend radially outward from the outer edge of the metal insert and have a peripheral edge 33 serving substantially the same function as the peripheral edge 26 of the clip members 23 shown in FIGS. 1 and 2. With this construction it is not necessary to fasten the clip members 23 to the metal insert 29 during assembly providing a savings in manufacture. The seal shown in FIGS. 3 and 4 may be mounted in the groove 24 of a surrounding body such as the wheel hub 14 shown in FIG. 2.

Figure 5:
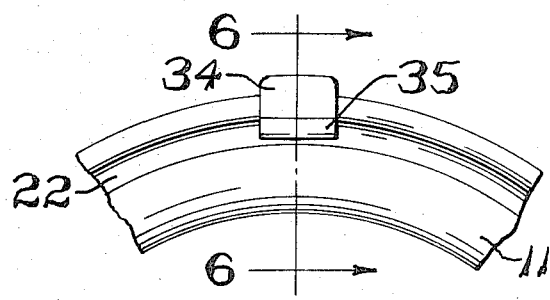
FIG. 5 is a fragmentary plan view of a further modification of the annular seal embodying the invention.
Figure 6:
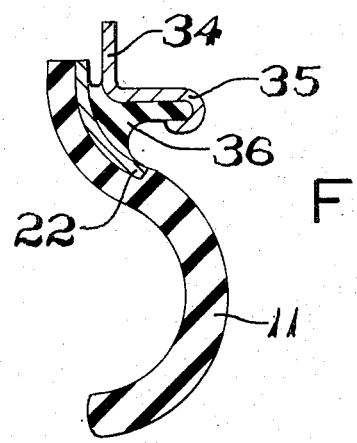
FIG. 6 is a sectional view taken along the plane of line 6—6 of FIG. 5.

Referring to FIGS. 5 and 6 a further modification is shown in which clip members 34 have axially extending flanges 35 adhered to resilient mountings 36 of rubber or other resilient rubberlike material which are adhered to the surface of the insert 22 rather than fastened directly to the insert as in the construction shown in FIGS. 1 and 2. The resilient mountings 36 of the clip members 34 on the seal permits them to be tilted and inserted in the groove 24 of a wheel hub 14 as shown in FIG. 2. This is especially advantageous where the seal has a small diameter or where the material of the seal and the insert do not have the inherent elasticity necessary to provide the deflection of the clip members 34 for insertion into the groove 24 of the wheel hub 14.

Figure 7:
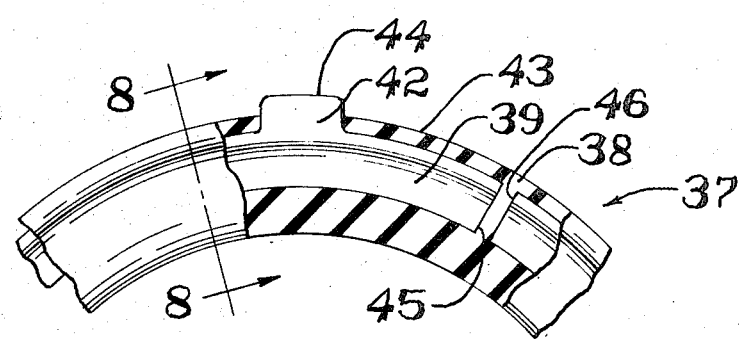
FIG. 7 is a fragmentary plan view of a still further modification of the seal embodying the invention with certain parts being cut away to show the gap in the reinforcing member.
Figure 8:
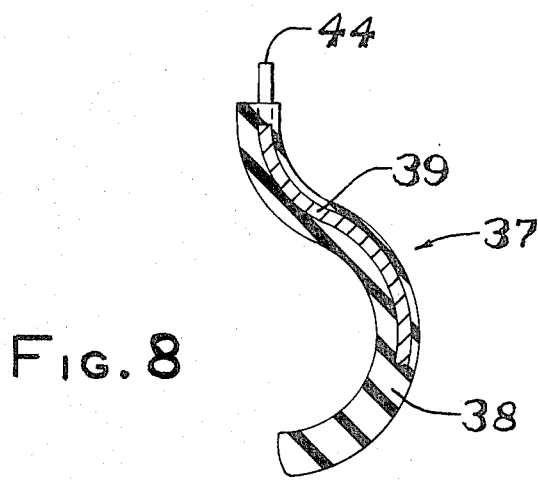
FIG. 8 is a sectional view taken along the plane of line 8—8 of FIG. 7.

A still further modification of the invention is shown in FIGS. 7 and 8 in which a seal 37 has a ring 38 of rubber or other resilient rubberlike material in which an insert 39 of metal or other reinforcing material is embedded and extends circumferentially of the ring. Clip members such as extensions 42 of the insert 39 extend outwardly from the outer edge 43 of the ring 38 providing peripheral edges 44 for engagement with the bottom wall 27 of the groove 24 on a wheel hub 14 of the type shown in FIG. 2. As shown in FIG. 7 the insert 39 is not circumferentially continuous and has ends 45 and 46 spaced apart to form a gap so that the insert 39 may be forshortened to deflect the clip members 42 sufficiently for insertion into the groove 24 of the wheel hub 14 as shown in FIG. 2. It will be noted that in this modification the insert 39 extends radially inward over substantially two-thirds of the width of the ring 38 to provide greater stiffness to the seal 37. This does not adversely affect the installation of the seal because with the gap between the ends 45 and 46 sufficient deflection of the extensions 42 is obtainable through forshortening of the insert 39.

With the construction of the invention shown in the preferred embodiment of FIGS. 1 and 2 and in the modifications of FIGS. 3 and 4, FIGS. 5 and 6, and FIGS. 7 and 8 a seal is provided which is of one-piece construction and has clip members for insertion into the groove 24 of the wheel hub 14. The width of the groove does not require close machining tolerances because the clip members press against the outer side wall 28 of the groove 24 and the resilient rubberlike material of the rings 11 and 38 is pressed against the other side wall of the groove or an extension of the side wall which is the surface of the shoulder 13. The peripheral edges 26, 33 and 44 of the clip members also hold the seal in concentric relationship making it unnecessary to have another seating edge on the cylindrical flange 25 for centering the seal. It is understood that other modifications not shown may be made to take advantage of the features of the invention.

I claim:

1. An annular seal for mounting in a surrounding cylindrical body having an annular groove at the radially inner surface comprising a ring of resilient rubberlike material, a reinforcing member extending circumferentially of said ring and adhered therein, said ring having a radially outer edge, at least three retaining clip members disposed at circumferentially spaced-apart positions around said ring and extending radially outward from said outer edge of said ring a predetermined distance to peripheral edges, said clip members being resiliently mounted on said seal for tilting deflection during insertion of said clip members into said groove of said surrounding cylindrical body and for resilient engagement with one sidewall of said groove to urge said outer edge of said ring into sealing engagement with an opposing radially extending wall of said cylindrical body and said peripheral edges of said clip members being adapted to engage a bottom wall of said groove to hold said seal in a predetermined concentric relationship in said cylindrical body.

2. An annular seal according to claim 1 wherein said clip members are fastened to said reinforcing member.

3. An annular seal according to claim 1 wherein said clip members are integral with said reinforcing member.

4. An annular seal according to claim 1 further comprising resilient mountings, said clip members being connected to said reinforcing member by said resilient mountings providing resilient tilting deflection of said clip members relative to said reinforcing member for insertion of said clip members in said groove of said surrounding cylindrical body.

5. An annular seal according to claim 4 wherein each of said clip members has an axially extending flange at the radially inward edge of the clip member, one of said resilient mountings being adhered to said flange and to said reinforcing member for tilting of said clip members during insertion in said groove of said surrounding body.

6. An annular seal according to claim 3 wherein said reinforcing member and said clip members are of a resilient metallic material providing for tilting deflection of said clip members and retention of the annular seal in said surrounding cylindrical body.

* * * * *